(12) United States Patent
Bilton et al.

(10) Patent No.: US 8,677,729 B2
(45) Date of Patent: Mar. 25, 2014

(54) SYSTEM FOR HEATING A FUEL

(75) Inventors: Timothy Russell Bilton, Simpsonville, SC (US); David Wesley Ball, Jr., Easley, SC (US); Brian Michael Gallagher, Simpsonville, SC (US); Korey Frederic Rendo, Greer, SC (US); Gary Cletus Mobley, Jr., Greenville, SC (US)

(73) Assignee: General Electric Company, Schenectady, NY (US)

( * ) Notice: Subject to any disclaimer, the term of this patent is extended or adjusted under 35 U.S.C. 154(b) by 393 days.

(21) Appl. No.: 13/280,659

(22) Filed: Oct. 25, 2011

(65) Prior Publication Data
US 2013/0098038 A1 Apr. 25, 2013

(51) Int. Cl.
*F02C 7/08* (2006.01)
*F02G 1/00* (2006.01)

(52) U.S. Cl.
USPC .............................. 60/39.5; 60/736

(58) Field of Classification Search
USPC ................. 60/39.01, 39.5, 734, 736
See application file for complete search history.

(56) References Cited

U.S. PATENT DOCUMENTS

| 4,912,928 | A | 4/1990 | Kaneko et al. |
| 5,632,143 | A | 5/1997 | Fisher et al. |
| 5,799,490 | A | 9/1998 | Bronicki et al. |
| 5,845,481 | A * | 12/1998 | Briesch et al. ................. 60/776 |
| 6,205,762 | B1 * | 3/2001 | Uematsu et al. ............... 60/775 |
| 6,269,626 | B1 * | 8/2001 | Kim ......................... 60/39.182 |
| 6,913,068 | B2 | 7/2005 | Togawa et al. |
| 8,015,793 | B2 * | 9/2011 | Austin et al. ................. 60/39.52 |
| 8,117,821 | B2 * | 2/2012 | Mazumder et al. ........... 60/39.12 |
| 2008/0115483 | A1 * | 5/2008 | Moore et al. ............... 60/39.461 |

* cited by examiner

*Primary Examiner* — Hoang Nguyen
(74) *Attorney, Agent, or Firm* — Ernest G. Cusick; Frank A. Landgraff

(57) ABSTRACT

An embodiment of the present invention takes the form of a system that uses exhaust from the combustion turbine engine to heat the fuel gas consumed by a combustion turbine engine. The benefits of the present invention include reducing the need to use a parasitic load to heat the fuel gas.

17 Claims, 2 Drawing Sheets

SYSTEM FOR HEATING A FUEL

BACKGROUND OF THE INVENTION

The present invention relates to the fuel consumed by a combustion turbine engine during operation; and more particularly to a system that uses exhaust from a combustion turbine engine to heat the fuel.

The temperature of the fuel consumed by a combustion turbine engine is generally required to be within a specific range. The fuel may include, but is not limited to, various type of fuel oil, a natural gas, or a synthetic gas. The combustion systems on some combustion turbine engines require heated natural gas. Generally, the supplied natural gas is not heated. Here, a fuel heater is used to increase the temperature of the natural gas to meet the combustion turbine engine requirements. The fuel heater requires an energy source for operation. This energy source is considered a parasitic load on the combustion turbine engine.

The exhaust generated by the combustion turbine engine is discharged to the ambient environment. Hence, the heat within the discharged exhaust is not reclaimed.

For the foregoing reasons, there is a need for a system that reduces the parasitic load associated with heating the fuel consumed by a combustion turbine engine. The system should use the heat from the exhaust to increase the temperature of the fuel supplied to the combustion turbine engine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment of the present invention, a system comprising: a combustion turbine engine that operatively discharges an exhaust stream; a stack fluidly connected to a downstream section of the combustion turbine engine; wherein the stack comprises: an opening through which some of the exhaust stream discharges into atmosphere; a stack penetration integrated with the stack, wherein the stack penetration directs an exhaust stream portion away from the opening; a stack return integrated with the stack, wherein the stack returns the exhaust stream portion to the stack; a heat exchanger fluidly connected downstream of the stack penetration, wherein the heat exchanger comprises an exhaust inlet port that receives the exhaust stream portion originating at the stack penetration, and an exhaust outlet port that discharges the exhaust stream portion to the stack; an exhaust flow circuit fluidly connected between the stack and the heat exchanger; wherein the exhaust flow circuit comprises: an exhaust supply path comprising: a first end integrated with a discharge of the stack penetration; a bypass valve located downstream of the first end, and a second end connected to the exhaust inlet port of the heat exchanger; an exhaust return path comprising: a first end connected to the stack return, and a second end connected to the exhaust outlet port of the heat exchanger; a fuel gas flow circuit fluidly connected to the heat exchanger; the fuel gas flow circuit comprising: a fuel supply path comprising: a supply end integrated with a fuel gas supply system; and a discharge end connected to a fuel inlet port of the heat exchanger; and a fuel discharge path comprising: a first end connected to a fuel outlet port of the heat exchanger; and a second end connected to a fuel system; and wherein the heat exchanger operatively transfers heat from the exhaust stream portion, flowing through the exhaust flow circuit; to fuel gas, flowing through the fuel gas flow circuit.

In accordance with a second embodiment of the present invention, a system comprising: a gas turbine comprising: an inlet section, a compressor section, a combustion section, and an exhaust section that operatively discharges an exhaust stream; a stack fluidly connected to a downstream section of the exhaust section; wherein the stack comprises: an opening through which some of the exhaust stream discharges into atmosphere; a stack penetration integrated with the stack, wherein the stack penetration directs an exhaust stream portion away from the opening; a stack return integrated with the stack, wherein the stack return directs the exhaust stream portion to the stack; a fuel gas heater fluidly connected downstream of the stack penetration, wherein the fuel gas heater comprises an exhaust inlet port that receives the exhaust stream portion originating at the stack penetration, and an exhaust outlet port that discharges the exhaust stream portion to the stack; an exhaust flow circuit fluidly connected between the stack and the fuel gas heater; wherein the exhaust flow circuit comprises: an exhaust supply path comprising: a first end integrated with a discharge of the stack penetration; a bypass valve located downstream of the upstream end, and a second end connected to the exhaust inlet port of the fuel gas heater; an exhaust return path comprising: a first end connected to the stack return, a second end connected to the exhaust outlet port of the fuel gas heater, and a blower that drives the exhaust stream portion from the exhaust outlet port to the stack return; a fuel gas flow circuit fluidly connected to the fuel gas heater; the fuel gas flow circuit comprising: a fuel supply path comprising: a supply end integrated with a fuel gas supply system; and a discharge end connected to a fuel inlet port of the fuel gas heater; and a fuel discharge path comprising: a first end connected to a fuel outlet port of the fuel gas heater; and a second end connected to a fuel system; and wherein the fuel gas heater operatively heats the fuel gas from a first temperature to a second temperature.

BRIEF DESCRIPTION OF THE DRAWINGS

These and other features, aspects, and advantages of the present invention may become better understood when the following detailed description is read with reference to the accompanying figures (FIGS) in which like characters represent like elements/parts throughout the FIGS.

DETAILED DESCRIPTION OF THE INVENTION

Figure 1:
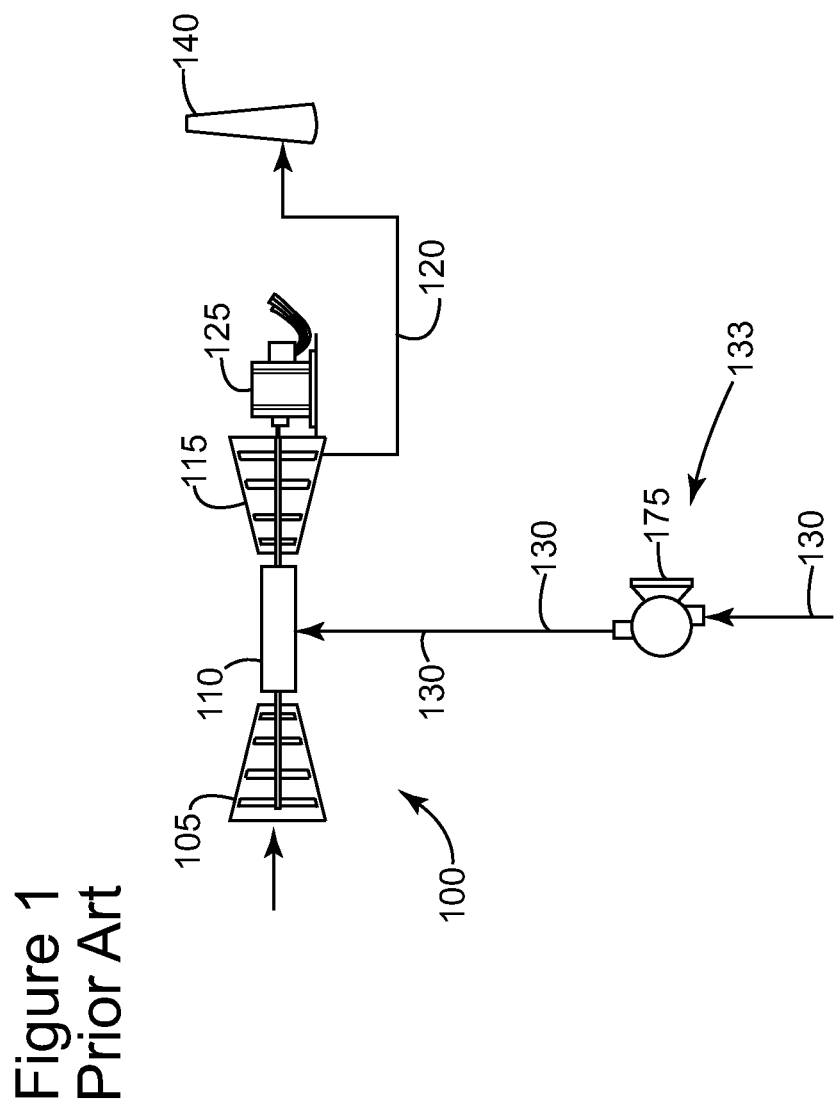
FIG. 1 is a schematic illustrating a known environment in which an embodiment of the present invention may operate.

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the FIGS. Indeed, the element or elements of an embodiment of the present invention may be oriented in any direction and the terminology, therefore, should be understood as encompassing such variations unless specified otherwise.

The present invention may be applied to the variety of combustion turbine engines that produce an exhaust fluid, such as, but not limiting of, a heavy-duty gas turbine; an aero-derivative gas turbine; or the like. An embodiment of the present invention may be applied to either a single combustion turbine engine or a plurality of combustion turbine engines. An embodiment of the present invention may be applied to a combustion turbine engine operating in a simple cycle.

An embodiment of the present invention takes the form of a system that uses exhaust generated by the combustion turbine engine to heat the fuel gas consumed by a combustion turbine engine. The elements of the present invention may be fabricated of any material that can withstand the operating environment under which embodiments of the present invention may operate.

Referring now to the Figures, where the various numbers represent like elements throughout the several views, FIG. 1 is a schematic illustrating a known environment in which an embodiment of the present invention may operate.

FIG. 1 illustrates a combustion turbine engine 100 in a simple cycle configuration. The combustion turbine engine 100 generally comprises a compressor 105, a combustion system 110, and a turbine section 115. A stack 140 may be located downstream of the turbine section 115.

Generally, the compressor 105 receives and compresses an inlet air, represented by an arrow in FIG. 1. The compressed air may flow downstream to the combustion system 110, where the compressed air is mixed with a fuel 130, such as, but not limiting of, a natural gas. The energy released during the combustion process flows downstream and drives the turbine section 115. A load, such as, but not limiting of, a generator 125 may be coupled to the combustion turbine engine 100. Here, the mechanical torque generated in the turbine section 115 is converted to electrical energy. The exhaust 120 generated during the operation of the combustion turbine engine 100 discharges through the stack 140.

The combustion turbine engine 100 may receive the fuel 130 from a fuel supply system 133. The fuel supply system 133 originates where the fuel 130 is supplied to the site via a fuel compressor 175 and eventually flows to the combustion system 110. As discussed, some combustion turbine engines 100 require heated fuel for performance and/or other reasons. Here, a parasitic load, such as, but not limiting to, a fuel gas heater 185 (illustrated in FIG. 2) heats the fuel 130 to the desired operating range.

Figure 2:
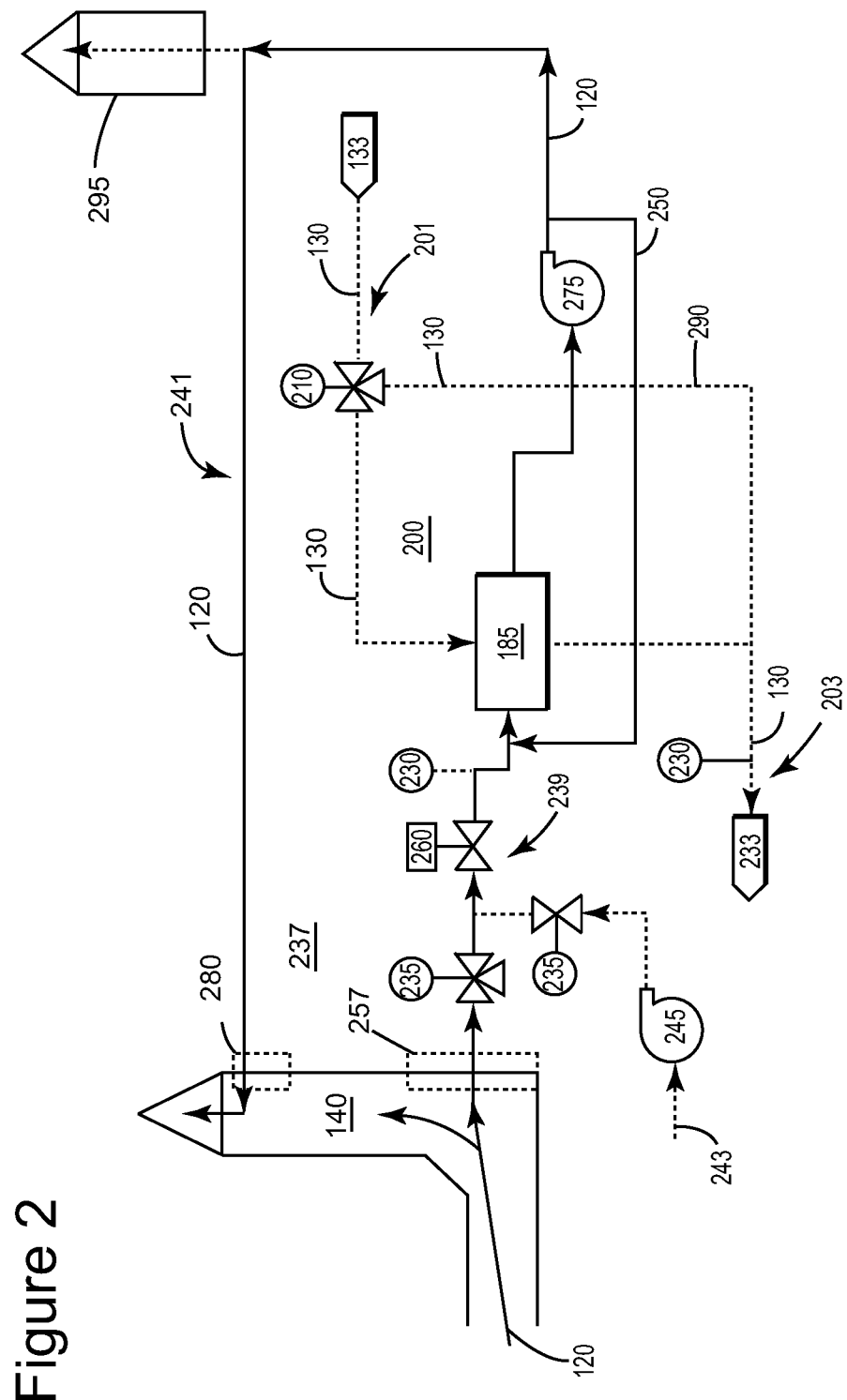
FIG. 2 is a schematic illustrating an embodiment of the present invention.

FIG. 2 is a schematic illustrating an embodiment of the present invention. As discussed, the present invention may apply to a combustion turbine engine 100 operating in a simple cycle mode. Therefore, for the purposes of this discussion, the flow of the exhaust 120 begins at the stack 140. Embodiments of the present invention may comprise: the stack 140; a fuel gas heater 185; a fuel gas flow circuit 200; and an exhaust flow circuit 237.

An embodiment of the stack 140 may comprise a cylindrical shape with an opening at the top. Operationally, the stack 140 allows the exhaust stream 120 to discharge into atmosphere.

The stack 140 may also comprise a stack penetration 257. The stack penetration 257 includes structure that diverts some of the exhaust 120 (also referred to "exhaust stream portion") from flowing out of the stack 140 and into the exhaust flow circuit 237. In an embodiment of the present invention, the stack penetration 257 may divert a large portion of the exhaust 120 to the exhaust flow circuit 237. In an alternate embodiment of the present invention, the stack penetration 257 may divert up to 10% of the exhaust 120 to the exhaust flow circuit 237.

The stack 140 may also comprise a stack return 280. The stack return 280 may include structure that channels the exhaust stream portion 120 from a discharge of the fuel gas heater 185 to the stack 140.

The fuel gas heater 185 operatively transfers heat from the exhaust stream portion 120 to the fuel 130. The fuel gas heater 185 may be fluidly connected downstream of the stack penetration 257. An embodiment of the fuel gas heater 185 may comprise an exhaust inlet port that may receive the exhaust stream portion 120 from the exhaust supply path 239 via the stack penetration 257. An embodiment of the fuel gas heater 185 may also comprise an exhaust outlet port that discharges the exhaust stream portion 120 to the exhaust return path 241.

The fuel gas flow circuit 200 moves the fuel 130 through the fuel gas heater 185; and comprises a fuel supply path 201 and a fuel discharge path 203. The fuel gas flow circuit 200 may be fluidly connected to the heat exchanger. The fuel supply path 201 may include: a supply end integrated with a fuel gas supply system 133; and a discharge end connected to a fuel inlet port of the fuel gas heater 185. The fuel discharge path 203 may include a first end connected to a fuel gas outlet port of the fuel gas heater 185; and a second end connected to a fuel system 233, which may be (directly or indirectly) fluidly connected to a combustion system 110.

An embodiment of the fuel supply path 201 may comprise at least one temperature control valve 210; which may operationally assist with regulating the temperature of the fuel 130. The temperature control valve 210 may have the form of a three-way valve, as illustrated in FIG. 2. Here, an inlet port of the temperature control valve 210 may receive fuel 130 from the fuel supply system 133. A first outlet port may direct portions of the fuel 130 to the fuel gas heater 185. A second outlet port may direct portions of the fuel to a fuel bypass circuit 290 that bypasses the fuel gas heater 185, as illustrated in FIG. 2. In an alternate embodiment of the present invention, the temperature control valve 210 may have the form of a two-way valve. Here, the fuel supply path 201 may comprise multiple two-way valves positioned in an arrangement that allows a collective functionality similar to that of the aforementioned three-way valve.

An alternate embodiment of the present invention may comprise at least one temperature measuring device 230 that measures a temperature of fuel 130 within the fuel discharge path 203. The temperature in this region may be considered a critical or controlling parameter of the present invention.

The exhaust flow circuit 237 may be fluidly connected between the stack 140 and the fuel gas heater 185. The exhaust flow circuit 237 may comprise an exhaust supply path 239 and an exhaust return path 241.

An embodiment of the exhaust supply path 239 may comprise: a first end integrated with a discharge of the stack penetration 257; a stop valve 260 located downstream of the upstream end, and a second end connected to the exhaust inlet port of the fuel gas heater 185. An embodiment of the exhaust supply path 239 may further comprise at least one temperature measuring device 230 that measures a temperature of fluid within the exhaust supply path 239.

An embodiment of the exhaust return path 241 may comprise: a first end connected to the stack return 280, and a second end connected to the exhaust outlet port of the fuel gas heater 185. The embodiment of the exhaust return path 241 may further comprise a fluid circulation device 275 that moves the exhaust stream portion 120 from the outlet port, of the fuel gas heater 185, to the stack return 280. An embodiment of the fluid circulation device 275 may include the form of a blower, a fan, or the like.

An embodiment of the exhaust return path 241 may further comprise at least one temperature measuring device 230, which may measure a temperature of fluid within the exhaust return path 241.

An embodiment of the exhaust flow circuit 237 may further comprise a cooling circuit 243 connected between the stack penetration 257 and the stop valve 260 of the exhaust supply path 239. The cooling circuit 243 may comprise a fluid circulation device 245, which operatively supplies a cooling fluid to the exhaust supply path 239. This cooling fluid may include, but is not limited to: plant air, ambient air, an inert gas, or the like. The cooling circuit 243 may cool the exhaust stream portion 120 to a temperature sufficiently below the auto-ignition temperature of the fuel 130. An embodiment of the fluid circulation device 245 may have the form of: a blower, a fan, or the like.

An embodiment of the exhaust return path 241 may comprise an exhaust recirculation path 250. This feature may allow the exhaust 120, exiting the fluid circulation device 275, to return to the exhaust inlet port of the fuel gas heater 185.

In use, embodiments of the present invention may operate as follows. As the combustion turbine engine 100 operates the exhaust 120 flows to the stack 140. Here, the stack penetration 257 may open to allow a portion of the exhaust stream portion 120 to enter the exhaust supply path 239 of the exhaust flow circuit 237. Next, the stop valve 260 may open to allow the exhaust stream portion 120 to enter the fuel gas heater 185. As this occurs, the temperature measuring devices 230 may determine the temperature of the exhaust stream portion 120. If the temperature is not sufficiently below the auto-ignition temperature of the fuel 130, then the cooling circuit 243 may operate the blower 245 to introduce the cooling fluid into the exhaust supply path 239. This may cool the temperature of the exhaust stream portion 120 to a temperature below the auto-ignition temperature of the fuel 130.

As the exhaust flow circuit 237 operates, the fuel gas flow circuit 200 may also operate. Here, the fuel system supply 133 may allow the fuel 130 to enter the fuel supply path 201. Next, the temperature control valve 210 may function, as described, based on the fuel requirements of the combustion turbine engine. Next, the fuel enters the fuel gas heater 185, as described.

The fuel gas heater 185, operatively transfers heat from the exhaust stream portion 120 to the fuel 130. The temperature measuring device 230, measuring the temperature of the fuel 130 at the discharge of the fuel gas heater 185, may aid in controlling the operation of the fuel heating process. This may ensure that the desired outlet temperate of the fuel 130 may be maintained.

An embodiment of the fuel gas heater 185 may have the form of a heat exchanger comprising physically separate compartments. A first compartment may allow the exhaust stream portion 120 to flow through. A second compartment may allow the fuel 130 to flow through. These compartments may be designed to prevent the mixing of the exhaust 120 and the fuel 130.

After flowing through the fuel gas heater 185, the exhaust stream portion 120 may enter the exhaust return path 241 and return to the stack 140 via the stack return 280. In an alternate embodiment of the present invention, the exhaust stream portion 120 may discharge out of an alternate stack 295, as illustrated in FIG. 2. As discussed, the fluid circulation device 275 may assist with moving the exhaust stream portion 120 through the exhaust flow circuit 237.

Similarly, the fuel 130 may flow through the fuel discharge path 203 to discharge from the fuel gas flow circuit 200. Next, the now heated fuel 130 may enter the fuel system 233, as described.

Although specific embodiments have been illustrated and described herein, those of ordinary skill in the art appreciate that any arrangement, which is designed to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

As one of ordinary skill in the art will appreciate, the many varying features and configurations described above in relation to the several embodiments may be further selectively applied to form other possible embodiments of the present invention. Those in the art will further understand that all possible iterations of the present invention are not provided or discussed in detail, even though all combinations and possible embodiments embraced by the several claims below or otherwise are intended to be part of the instant application. In addition, from the above description of several embodiments of the invention, those skilled in the art will perceive improvements, changes, and modifications. Such improvements, changes, and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A system comprising:
    a combustion turbine engine that operatively discharges an exhaust stream;
    a stack fluidly connected to a downstream section of the combustion turbine engine; wherein the stack comprises:
        an opening through which some of the exhaust stream discharges into atmosphere;
        a stack penetration integrated with the stack, wherein the stack penetration directs an exhaust stream portion away from the opening;
        a stack return integrated with the stack, wherein the stack returns the exhaust stream portion to the stack;
    a heat exchanger fluidly connected downstream of the stack penetration, wherein the heat exchanger comprises an exhaust inlet port that receives the exhaust stream portion originating at the stack penetration, and an exhaust outlet port that discharges the exhaust stream portion to the stack;
    an exhaust flow circuit fluidly connected between the stack and the heat exchanger; wherein the exhaust flow circuit comprises:
        an exhaust supply path comprising: a first end integrated with a discharge of the stack penetration; a bypass valve located downstream of the first end, and a second end connected to the exhaust inlet port of the heat exchanger;
        an exhaust return path comprising: a first end connected to the stack return, and a second end connected to the exhaust outlet port of the heat exchanger;
    a fuel gas flow circuit fluidly connected to the heat exchanger; the fuel gas flow circuit comprising:
        a fuel supply path comprising: a supply end integrated with a fuel gas supply system; and a discharge end connected to a fuel inlet port of the heat exchanger; and
        a fuel return path comprising: a first end connected to a fuel outlet port of the heat exchanger; and a second end connected to a fuel system; and
    wherein the heat exchanger operatively transfers heat from the exhaust stream portion, flowing through the exhaust flow circuit; to fuel gas, flowing through the fuel gas flow circuit.

2. The system of claim 1, wherein the exhaust return path comprises an isolation valve located between the first end and the second end.

3. The system of claim 2 further comprising an exhaust bypass circuit that fluidly connects the exhaust supply path and the exhaust return path.

4. The system of claim 3 further comprising an exhaust bypass valve.

5. The system of claim 1, wherein the exhaust return path comprises a device that moves the exhaust stream portion from the exhaust outlet port to the stack return.

6. The system of claim 1 further comprising a cooling circuit connected between the stack penetration and the bypass valve of the exhaust supply path; wherein the cooling circuit comprise a fluid circulation device, which operatively supplies a cooling fluid to the exhaust supply path.

7. The system of claim 1 further comprising at least one temperature measuring device that measures a temperature of fluid within the exhaust supply path.

8. The system of claim 1 further comprising: at least one temperature measuring device that measures a temperature of fluid within the exhaust return path.

9. The system of claim 1 further comprising: at least one temperature control valve fluidly located within the fuel supply path.

10. The system of claim 1 further comprising a fuel bypass circuit that fluidly connects the fuel supply path and the fuel discharge path.

11. The system of claim 6 further comprising at least one temperature control valve fluidly located within the exhaust supply path.

12. The system of claim 1 further comprising at least one temperature measuring device that measures a temperature of fuel within the fuel discharge path.

13. The system of claim 1 further comprising an alternate stack fluidly integrated with the exhaust return path.

14. The system of claim 13, wherein the alternate stack discharges the exhaust stream portion received from the exhaust return path.

15. A system comprising:
    a gas turbine comprising: an inlet section, a compressor section, a combustion section, and an exhaust section that operatively discharges an exhaust stream;
    a stack fluidly connected to a downstream section of the exhaust section;
    wherein the stack comprises:
        an opening through which some of the exhaust stream discharges into atmosphere;
        a stack penetration integrated with the stack, wherein the stack penetration directs an exhaust stream portion away from the opening;
        a stack return integrated with the stack, wherein the stack return directs the exhaust stream portion to the stack;
    a fuel gas heater fluidly connected downstream of the stack penetration, wherein the fuel gas heater comprises an exhaust inlet port that receives the exhaust stream portion originating at the stack penetration, and an exhaust outlet port that discharges the exhaust stream portion to the stack;
    an exhaust flow circuit fluidly connected between the stack and the fuel gas heater; wherein the exhaust flow circuit comprises:
        an exhaust supply path comprising: a first end integrated with a discharge of the stack penetration; a bypass valve located downstream of the upstream end, and a second end connected to the exhaust inlet port of the fuel gas heater;
        an exhaust return path comprising: a first end connected to the stack return, a second end connected to the exhaust outlet port of the fuel gas heater, and a blower that drives the exhaust stream portion from the exhaust outlet port to the stack return;
    a fuel gas flow circuit fluidly connected to the fuel gas heater; the fuel gas flow circuit comprising:
        a fuel supply path comprising: a supply end integrated with a fuel gas supply system; and a discharge end connected to a fuel inlet port of the fuel gas heater; and a fuel discharge path comprising: a first end connected to a fuel outlet port of the fuel gas heater; and a second end connected to a fuel system; and wherein the fuel gas heater operatively heats the fuel gas from a first temperature to a second temperature.

16. The system of claim 15 further comprising a cooling circuit connected between the stack penetration and the stop valve of the exhaust supply path; wherein the cooling circuit comprise an air circulating device that operatively supplies a cooling fluid to the exhaust supply path.

17. The system of claim 15 further comprising a fuel bypass circuit comprising a fuel bypass circuit valve; wherein the fuel bypass circuit connects the fuel supply path and the fuel discharge path.

* * * * *